Aug. 3, 1954
A. L. IMSHAUG
2,685,136
GAUGE DEVICE FOR CHECKING DIMENSIONS OF PRINTING PLATES
Filed July 26, 1952
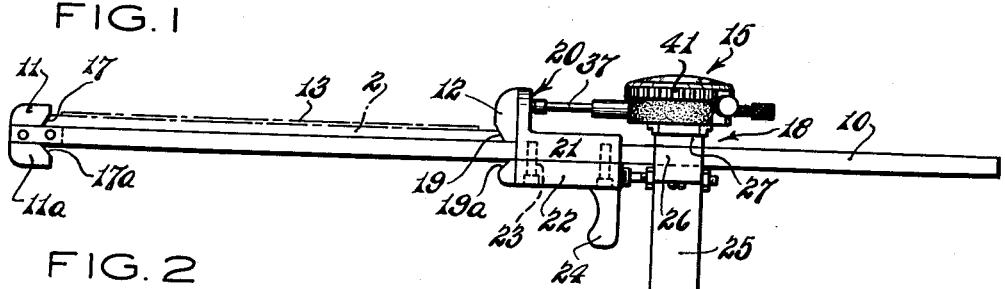
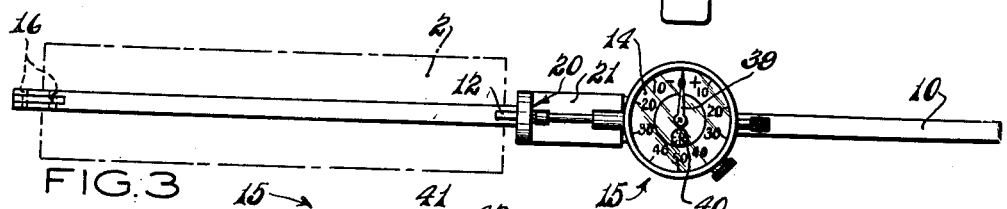
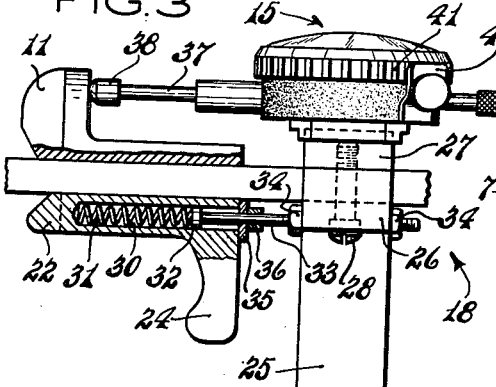
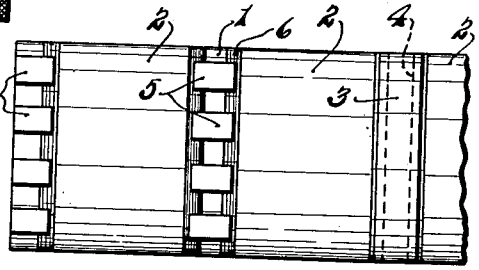
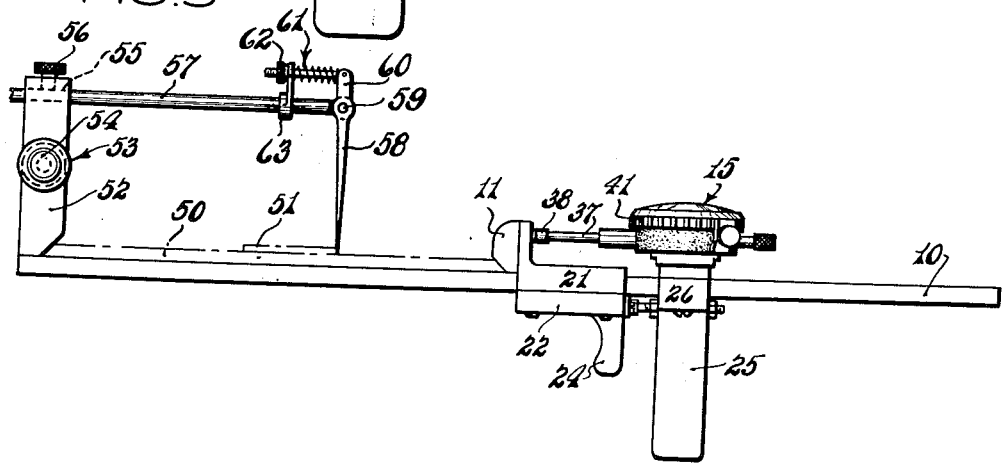
INVENTOR
ARNOLD L. IMSHAUG
BY Chapin & Neal
ATTORNEYS Patented Aug. 3, 1954

2,685,136

UNITED STATES PATENT OFFICE 2,685,136

GAUGE DEVICE FOR CHECKING DIMENSIONS OF PRINTING PLATES

Arnold L. Imshaugh, West Springfield, Mass.

Application July 26, 1952, Serial No. 301,151

3 Claims. (Cl. 33—147)

This invention relates to a gauging device for checking the dimensions of printing plates such as stereotype or electrotype plates and the like and has for an object to provide an instrument to insure accuracy in the measurement of such plates before clamping the same in the press assembly for printing.

Another object is to provide a device for checking flat or curved plates as to the width or length thereof and in which the usual beveled edges of a plate will be held in a manner simulating the actual conditions as they are held by the clamping mechanism of the press.

Further objects of the invention are to eliminate by the use of the gauge of this invention inaccurate registration of a printing plate or plates on the pages being printed, the buckling of plates in the press, the insecure locking of the plates on the press, and the imperfect printing from a plate improperly held in the press.

Still another object is to insure accuracy of registration in color printing.

These and other specific objects and advantages of the invention will be seen from the following description of an embodiment thereof as shown by the accompanying drawings, in which Fig. 1 is a side elevation of the new device;

Fig. 2 is a top plan;

Fig. 3 is a fragmentary view partly in section to show details of construction;

Fig. 4 is a top plan representation of a newspaper press cylinder with printing plates positioned thereon; and Fig. 5 is a side elevation of a gauge provided with a device for registering color plates and the like.

Referring first to the representation in Fig. 4 of a newspaper press cylinder 1 with semi-cylindrical printing plate segments 2 installed thereon, the need for accuracy in the measurement of such plates will be discussed. It should be noted, however, that the showing of newspaper printing plates is for illustrative purposes only and that the dimensions of flat printing plates as well can be checked with the gauging device as herein disclosed so as to insure accuracy in the operation thereof.

On the cylinder 1 the plate segments 2, each representing a page of a newspaper, are shown in one usual type of structure, the cylinder 1 having a center ring 3 located centrally thereon and provided with undercut edges as at 4 formed to receive the beveled edges of the plates 2 located on each side thereof. The opposite edge of a plate 2 is secured as by center clamps 5 which are slidably engaged on the cylinder 1 in suitable slots (not shown) provided therein. The center clamps 5 are also undercut to hold the adjacent beveled edge as at 6 of plate 2. Against the opposite undercut sides of clamps 5 another plate 2 is located, the outer beveled side of this plate being held by suitable lock-up clamps 7. Clamps 7 may or may not be automatically moved into clamping position according to the particular cylinder construction.

The plates 2 are made up and prepared for installation by the usual plate making machinery in which is included a knife to provide the beveled edge cuts. There may be several plate making machines in operation in a printing plant, and the individual knives of the machine should be set accurately to cut plates of identical dimensions. As may frequently occur the setting of one or more knives may vary for one reason or another and in this case the varying dimensions of the plates will cause an inaccurate clamping thereof on the cylinders. For example, from a consideration of Fig. 4 it will be noted that if one plate should be of less width than a prescribed dimension the plates will be insurely clamped and the shucking thereof is probable with the result that an inaccurate registration of the print on the page will take place; conversely, if a plate is of greater width than prescribed the plates can be buckled by the clamps and cause a poorly printed page; also, if one edge of a plate is not cut along a true straight edge and variations in the width thereof occur, one end of the plate may buckle with the other end being held loosely thus resulting in poor alignment of type on the printed page and poor printing.

Such inaccuracies in the plates result in improperly printed material on the page of a newspaper or any other printed copy desired and it is the principal object of the present invention to eliminate such hazards by providing a device for checking the accuracy of the dimensions made by the plate knives. Thus an improper setting of such knives may be immediately detected and corrected, and accuracy in the printed material is insured.

The gauge device of this invention, as shown by Figs. 1 and 2, comprises a rod support 10 preferably rectangular in cross section with opposed clamping jaws 11 and 12 between which a cylinder plate 2, having raised type 13 thereon, may be clamped and any variation from a predetermined dimension indicated on a dial 14 of a comparator gauge 15.

The jaw 11 is a fixed jaw member being secured as in a slotted end of the rod 10 by pins 16 (Fig. 2). Jaw 11 projects upwardly of the rod end having an inwardly facing undercut edge at 17 forming an acute angle with the straight edge top surface of rod 10. As shown the angle is approximately 60° and is formed to embrace a 60° beveled cut along the edge of plate 2. Any angle of undercut may be provided so long as it is formed to mate with the angle of the beveled plate edge. If desired (as shown by Fig. 1), a jaw piece 11a may be formed integral with jaw 11 and extending from the bottom edge of rod 10. The angle at 17a may be, for example, 45° angle suitable for checking a beveled cut of 45°.

Jaw 12 is a movable jaw mounted for limited travel toward and away from jaw 11 and relative to a frame member 18 fixed to the rod 10 and connected with the movable jaw. Jaw 12 has an angled edge surface at 19 similar to the angle at 17 and facing the fixed jaw. On jaw 12 a rearwardly facing wall surface at 20 is provided lying in a plane at right angles to the straight edge top surface of rod 10. Jaw 12 is slidable on rod 10 having a carriage block portion 21 straddling the rod and to the underside of which is secured an under body piece 22 as by screws 23 on each side thereof. The assembly is dimensioned to permit a free sliding movement on rod 10. The under body 22 at the forward edge thereof may be provided with a 45° undercut at 19a facing the edge 17a of the fixed jaw member. At its rear edge the under body is provided with a depending trigger piece 24 for manipulating the movable jaw.

Frame 18 is adjustably fixed on rod 10 having a clamping engagement therewith. A lower handle member 25 is provided with an upper forked portion 26 straddling the rod and capped by a support 27 for the gauge 15. The frame 18 is clamped into fixed relation on the rod by drawing the cap 27 and portion 26 against the rod by screws 28 (Fig. 3).

The frame and movable jaw are connected to yieldably urge the jaw to an extended position toward the fixed jaw by a pin and spring connection shown by Fig. 3. In the under body 22 a longitudinal bore 30 parallel to the rod 10 is formed with an open end in the rear face thereof. A compression spring 31 is seated in the bore and against said spring is positioned the head 32 of a pin 33 held in alignment with the bore by the portion 26 of the frame handle. Pin 33 is adjustably positioned in portion 26 by nuts 34 threaded thereon at opposite sides of portion 26. The head 32 of the pin is held within the bore by a collar plate 35 and bearing 36 suitably affixed to the rear surface of the under body 22. Thus the spring 31 acts through pressure on pin 33 to urge the movable jaw carriage away from the frame 18. The carriage may be retracted against such spring action by manipulating the trigger 24.

The comparator gauge 15 may be secured on the frame 18 by any suitable arrangement. The reciprocable stem 37 of the gauge is in parallel relation with rod 10 and its tip end 38 is positioned to contact the rear wall surface 20 of the movable jaw. The gauge shown is of a well known construction with the dial 14 thereof indicating plus or minus variations in the spacing between the movable jaw and frame by movement of a needle pointer 39 clockwise or counterclockwise respectively. The number of complete turns of the pointer are indicated by a small dial as at 40.

As is well known in this type of gauge the calibrated scale dial 14 may be turned by rotation of the dial cap 41 to register the zero mark at the position of the needle pointer, the cap being held in the rotative position desired by a leaf plate 42 bearing against the knurled rim.

In operation the gauge device is set for checking the dimensions of a plate by placing a master gauge of the predetermined linear dimension desired along the straight edge with the frame 18 clamped on the rod. The position of frame 18 is adjusted to that which provides in the spring pressed extended condition of the movable jaw a spacing between said jaws of less than the prescribed dimension and in retracted condition of the movable jaw a spacing greater than said dimension. It will thus be seen that when one end of the master gauge is set against the fixed jaw the movable jaw may be retracted and released to embrace the other end of the master gauge. With the master gauge thus held between the jaws the cap 41 of the comparator gauge is turned to register the zero mark with the pointer 39. The device is now set so that as the printing plates are made up and ready for installation on a press the device may be used to check the dimensions thereof. The jaw 12 is movable within its limits to indicate a plus or minus variation and in embracing a plate simulates the actual clamping position of the cylinder clamps. If at any time a plate is found to vary in the prescribed dimensions, the knife cutting such plate may be reset for accurate operation and the error in the inaccurate plate corrected if possible. If the error cannot be corrected a new plate can be prepared so as to insure the proper operation of the plates in the press.

In Fig. 5 a gauge device is shown in which additional means in the device is provided for checking the dimensions of color plates. As is well known in printing copy with colors a "black and white" first plate is provided which leaves spaces or outlines where the colored impression is to be made. A second or third or fourth plate is then made up which will receive colored ink to print the colors on the copy in the space desired. It will be obvious that a color plate impression must register accurately with the space provided therefor on the copy by the first plate. The structure disclosed by the form of Fig. 5 is designed to insure such accurate registration by checking the color plate or plates to make certain the relative position of the color type on such plates is the same as the relative position of the spacing or outline provided therefor on the black and white plate. Thus, if any inaccurate registration may be foreseen the inaccuracy in a color plate may be compensated for by appropriate corrective measures.

In Fig. 5 a color plate 50 with color type at 51 is shown being held in the device as previously described. The fixed jaw member includes an upright 52 having an upper portion providing a finger post member supported by a pivotal connection as at 53, a knob 54 being indicated therewith for the frictional pivotal turning of the upper portion and its indexing mechanism toward and away from plate 50.

The post member is provided with a bore 55 with a clamping screw 56 being adapted to adjustably position a bar 57 slidably received in the bore. Bar 57 is adapted to extend at its outer end into overhanging position above the straight edge of the rod 10 between the clamping jaws. At the end of bar 57 is an indexing finger 58 pivotally mounted thereon by a pin 59. Above the pivot the upper end 60 of the finger is connected by suitable linkage 61 to a link anchor support 63 fixed on bar 57, the upper end of the support 63 receiving the stem of the link member therethrough with a threaded adjusting nut 62 serving to adjust the same. As shown a spring seated between the support 63 and end portion 60 around the link holds the nut 62 in abutment against the opposite side of the support.

In operating the mechanism a black and white plate is first held in the device on the rod 10 and the indexing finger is adjusted through the mechanism shown to register with an edge of the outline or spacing on said plate. The color plate, as plate 50, is then placed in the device and any variations in the dimensions of the plate are noted together with any variations in the position of finger 58 with respect to the color type. Corrective measures may then be taken to re-cut the plate for the proper relative spacing or otherwise insure its proper placement on the press. For example, if the width of a color plate is greater than the prescribed dimension for the black and white plate and the color type is not in the same relative position with respect to one of the plate edges as was the outline on the black and white plate it can be determined which side of the color plate must be re-cut and to what degree to insure a proper registration of the color on the printed page. On the other hand should the dimensions of the color plate be less than that prescribed it may be determined which side of said plate could be shimmed to insure accurate registration of said color.

What is claimed is:

1. A gauging device for checking variations in the dimensions of printing plates comprising a rod having a straight edge and at one end thereof a fixed clamping jaw member with its inner edge facing said straight edge formed in acute angular relationship therewith for receiving the beveled edge of a printing plate to be measured thereby, a back stop assembly mounted on the rod having a movable clamping jaw on said rod formed with a complementary angled edge to clamp against the beveled edge at the opposite side of said printing plate, said movable jaw having a rearwardly facing surface at right angles to the plane of said straight edge at the upper rear side of said jaw and a carriage block slidably embracing said rod with a longitudinally disposed bore therein having a rearwardly directed opening, a compression spring seated in said bore and a depending trigger piece at the lower end edge of said block, said back stop also including a frame having a depending handle grip and embracing said rod with the movable jaw disposed between said frame and said fixed jaw, said frame having clamping means for adjustably securing the same in fixed position on said rod and in the lower portion thereof carrying a pin aligned with the bore of said carriage block, the front end of said pin being headed and slidably received in said bore against said spring, collar means at the entrance to said bore, said spring normally urging said pin outwardly of the block and pressing said collar means against the headed portion of said pin, a comparator gauge sensitive to variation in the spacing between said frame and movable jaw mounted on said frame with the reciprocable stem of said gauge being parallel to said rod and engaging at its tip end the rearwardly facing surface of said movable jaw.

2. A gauge device for checking the rectilinear dimensions of printing plates comprising a straight edge support having mounted thereon a fixed jaw member and a back stop assembly including a fixed frame member on said support and a movable jaw member slidably carried on the support between the frame member and fixed jaw member, at least one of said last two members being adjustable on said straight edge, a connector pin parallel to said straight edge and extending between said movable jaw member and frame member, said pin being anchored at one end to one of said members and at its other end being slidably received by the other member, said back stop assembly including spring means yieldably urging said movable jaw on the support in the direction of said fixed jaw, said pin having an abutment at the tip end thereof engageable by the aforesaid other member at the outward limit of relative travel between said movable jaw member and frame member, and a comparator gauge mounted on said back stop assembly with a reciprocable actuator stem extending between said jaw and frame members for indicating variations in the relative spacing therebetween, the facing edges of said jaws having surfaces to mate with the opposing edges of a printing plate to be measured thereby.

3. A gauge device for checking the rectilinear measurements of printing plates comprising a support having a straight edge and on the support a fixed jaw member and a back stop assembly with a movable jaw member and a frame member, said movable jaw member being slidably carried on the support between said fixed jaw and frame member and connected to the latter for limited reciprocable travel relative thereto, said connection between the frame and jaw members including a pin anchored to one of said members and slidably received by the other member, said pin and said other member having interengaging stop means limiting the travel of said movable jaw member away from said frame member, spring means on said back stop assembly urging said movable jaw member away from said frame member and a comparator gauge having a reciprocable stem parallel to said straight edge and extending between said members for actuation thereby responsive to the movement of said movable jaw, the facing edges of said jaws having surfaces to mate with the opposite edges of a printing plate to be measured thereby, said frame member having a hand grip depending therefrom with said movable jaw having a depending trigger finger in forwardly spaced relation to said hand grip.

References Cited in the file of this patent

UNITED STATES PATENTS

| Number | Name | Date |
|---|---|---|
| 143,904 | Hilgenreiner | Oct. 21, 1873 |
| 251,662 | Webb | Dec. 27, 1881 |
| 2,152,880 | Dowdy et al. | Apr. 4, 1939 |
| 2,447,612 | Dowe | Aug. 24, 1948 |
| 2,602,237 | Navarre | July 8, 1952 |

FOREIGN PATENTS

| Number | Country | Date |
|---|---|---|
| 573,862 | Great Britain | Dec. 10, 1945 |